(12) United States Patent
Allen, Jr. et al.

(10) Patent No.: US 9,026,990 B2
(45) Date of Patent: May 5, 2015

(54) DYNAMIC FILTERING OF A NAVIGATION PATH TO A SET OF MINIMUMS

(75) Inventors: Lloyd W. Allen, Jr., Cary, NC (US); Jana H. Jenkins, Raleigh, NC (US); Rebecca J. Schaller, Cary, NC (US); Tricia E. York, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1613 days.

(21) Appl. No.: 11/204,466

(22) Filed: Aug. 16, 2005

(65) Prior Publication Data

US 2007/0044076 A1    Feb. 22, 2007

(51) Int. Cl.
G06F 9/44 (2006.01)
G06F 17/27 (2006.01)
G06F 17/30 (2006.01)

(52) U.S. Cl.
CPC ............................. G06F 17/30716 (2013.01)

(58) Field of Classification Search
None
See application file for complete search history.

(56) References Cited

U.S. PATENT DOCUMENTS

| | | | |
|---|---|---|---|
| 5,361,361 A | 11/1994 | Hickman et al. | |
| 5,442,746 A | 8/1995 | Barrett | |
| 5,535,323 A | 7/1996 | Miller et al. | |
| 5,799,268 A * | 8/1998 | Boguraev | 704/9 |
| 5,877,757 A | 3/1999 | Baldwin et al. | |
| 6,009,442 A * | 12/1999 | Chen et al. | 715/205 |
| 6,259,445 B1 * | 7/2001 | Hennum et al. | 715/709 |
| 6,271,840 B1 * | 8/2001 | Finseth et al. | 715/236 |
| 6,411,924 B1 * | 6/2002 | de Hita et al. | 704/9 |
| 6,424,979 B1 | 7/2002 | Livingston et al. | |
| 6,587,121 B1 | 7/2003 | Nelson et al. | |
| 6,667,747 B1 | 12/2003 | Spellman et al. | |
| 6,801,222 B1 | 10/2004 | Dunham et al. | |
| 6,857,102 B1 * | 2/2005 | Bickmore et al. | 715/205 |
| 6,871,322 B2 | 3/2005 | Gusler et al. | |
| 7,036,072 B1 * | 4/2006 | Sulistio et al. | 715/205 |
| 7,117,437 B2 * | 10/2006 | Chen et al. | 715/254 |
| 2003/0106039 A1 * | 6/2003 | Rosnow et al. | 717/100 |
| 2004/0139400 A1 * | 7/2004 | Allam et al. | 715/526 |
| 2005/0076327 A1 * | 4/2005 | Helal et al. | 717/100 |
| 2005/0198617 A1 * | 9/2005 | Kim et al. | 717/109 |
| 2005/0256868 A1 * | 11/2005 | Shelton et al. | 707/5 |
| 2005/0262474 A1 * | 11/2005 | Windl | 717/109 |
| 2006/0059460 A1 * | 3/2006 | Phillips et al. | 717/109 |
| 2008/0250386 A1 * | 10/2008 | Erl | 717/100 |

OTHER PUBLICATIONS

Kupiec et al. A Trainable Document Summarizer. SIGIR '95 Proceedings of the 18th annual international ACM SIGIR conference on Research and development in information retrieval, pp. 68-73, 1995, Retrieved on [Dec. 12, 2014] Retrieved from the Internet: URL<http://dl.acm.org/citation.cfm?id=215333>.*

(Continued)

*Primary Examiner* — Thuy Dao
*Assistant Examiner* — Cheneca Smith
(74) *Attorney, Agent, or Firm* — Steven M. Greenberg, Esq.; CRGO Law

(57) ABSTRACT

Embodiments of the present invention address deficiencies of the art in respect to filtering technical documentation and provide a method, system and computer program product for rapid filtering technical documentation. In one embodiment, a data processing system for dynamically filtering technical documentation can include a rapid filter coupled to a viewer configured for rendering technical documentation in a window. The rapid filter can include program code enabled to concurrently render a summarized form of the technical documentation in a separate window.

15 Claims, 2 Drawing Sheets

(56) References Cited

OTHER PUBLICATIONS

Saggion et al. Generating Indicative-Informative Summaries with SumUM. Computational Linguistics. Dec. 2002, pp. 497-526. Retrieved on [Dec. 12, 2014] Retrieved from the Internet: URL<http://www.mitpressjournals.org/doi/pdf/10.1162/089120102762671963>.*

Russell, John, *Making it Personal: Information that Adapts to the Reader*; SIGDOC '03, Oct. 12-15, 2003, San Francisco, CA.

* cited by examiner

DYNAMIC FILTERING OF A NAVIGATION PATH TO A SET OF MINIMUMS

BACKGROUND OF THE INVENTION

1. Field of the Invention

The present invention relates to the field of technical support for a software product and more particularly to filtering technical documentation.

2. Description of the Related Art

Modern technology can be complex in nature and technical documentation is often used to describe modern technology. Originally in paper form, technical documentation can range from a paper description of the specifications for a technology, to a detailed instruction manual for configuring and deploying a technology. Recently, technical documentation has migrated to electronic form due to the ease in which a viewer can scan and search specific portions of an electronic document without requiring reference to a paper index. Initially associated with software products as online help, electronic documentation now subsists as an independent product, which can relate to any number of technologies including, but not limited to software technologies.

Generally, technical documentation is a one-size-fits-all proposition. Technical writers produce technical documentation with an intended, model reader in mind. Oftentimes, technical writers fail to account for varying degrees of technical expertise in drafting technical documentation. Notwithstanding, some effort has been expended in producing technical documents that address various levels of expertise. In the latter circumstance, unique notational structure can be applied to technical documentation to indicate portions of material from the technical documentation which are suitable for understanding by one demographic of user, while the remaining portions of material from the technical documentation can be suitable for a different demographic.

In many circumstances, technical documentation describes a sequence of steps to be performed to achieve a particular goal such as the configuration of a software system. For the technical writer, it can be challenging to determine how much detail to provide in describing the necessary sequence of steps. For the uninitiated, complexity can be confusing. Likewise, for the experienced reader, simplicity can neglect subtle nuances of interest. Conversely, for the experienced reader, simplicity may be all that is required, while for the uninitiated, complexity and detail can be required to understand the sequence of required steps.

To address the difficulty in crafting technical documentation suitable for a wide ranging audience, several methodologies have been proposed and implemented. For instance, summary outlines have been provided where each entry in the outline can be an active hyperlink to a more detailed explanation of the entry. In this way, simplicity is the default position, while complexity is an optional position. As another example, search engines have been coupled to documentation to allow the reader to specify keywords for filtering technical documentation to a select number of topics. In the former circumstance, the reader is forced to choose between simplicity and complexity. In the latter circumstance, the successful filtering of the technical documentation remains subject to the effective selection of search terms by the reader.

BRIEF SUMMARY OF THE INVENTION

Embodiments of the present invention address deficiencies of the art in respect to filtering technical documentation and provide a novel and non-obvious method, system and computer program product for rapid filtering of technical documentation. In a first embodiment, a data processing system for dynamically filtering technical documentation can include a rapid filter coupled to a viewer configured for rendering technical documentation in a window. The rapid filter can include program code enabled to concurrently render a summarized form of the technical documentation in a separate window.

In one aspect of the embodiment, the rapid filter further can include program code enabled to selectably show and hide step details for a step described in the technical documentation. In another aspect of the embodiment, the rapid filter further can include program code enabled to selectably activate a pre-configured filter for the technical documentation. Finally, in yet another aspect of the embodiment, the rapid filter further can include program code enabled to keyword search the technical documentation.

In a second embodiment of the invention, a method for dynamically filtering technical documentation can include concurrently displaying a rapid filter user interface along with a technical documentation user interface and rendering technical documentation in the technical documentation user interface while rendering a summarized form of the technical documentation in the rapid filter user interface. The method further can include hiding details for the technical documentation in the rapid filter user interface responsive to a selection. The method yet further can include filtering the technical documentation according to a pre-configured filter selected within the rapid filter user interface. Finally, the method can include keyword searching the technical documentation according to search terms provided through the rapid filter user interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for rapid filtering technical documentation. In accordance with an embodiment of the present invention, a rapid filter can be activated from technical documentation. The rapid filter can permit the summarization of tasks in the technical documentation in a separate window displayed concurrently with the display of the technical documentation. The rapid filter further can include a set of pre-set parameters to be applied in rendering a filtered version of the technical documentation in the display of the technical documentation. The rapid filter yet further can include hyperlinks between the tasks and corresponding expanded text in the technical documentation. Finally, the content of the rapid filter can be searched through a keyword searching interface to the rapid filter.

Figure 1:
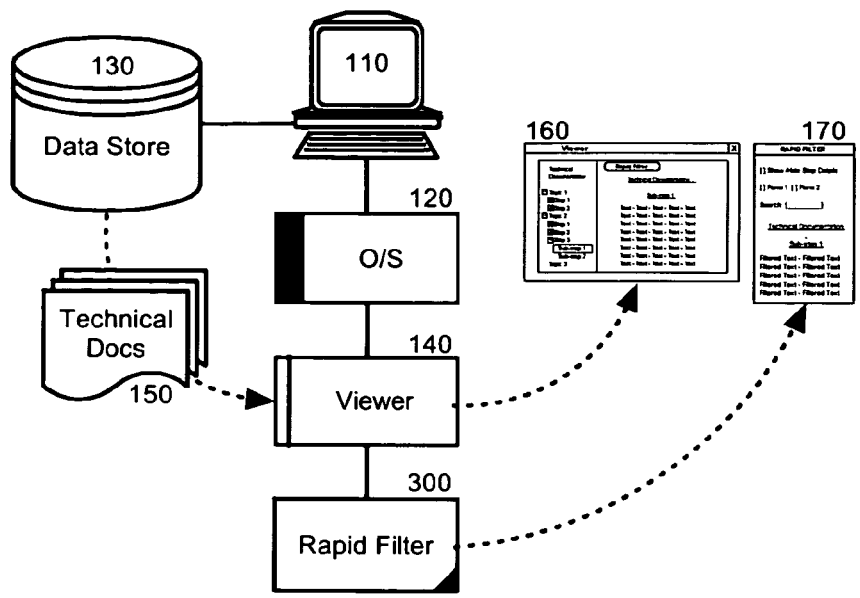
FIG. 1 is a schematic illustration of a system configured for rapid filtering technical documentation.

In further illustration, FIG. 1 is a schematic illustration of a system configured for rapid filtering technical documentation. The system can include a computing platform 110 having an operating system 120. The operating system 120 can host the execution of a viewer 140 configured for viewing technical documentation 150 disposed in the data store 130. In this regard, the viewer 140 can render a user interface display 160 of the technical documentation in the computing platform 110.

In accordance with the invention, rapid filter logic 300 can be coupled to the viewer 140. The rapid filter logic 300 can be applied to the technical documentation 150 displayed in the user interface display 160 to produce a filtered version of the technical documentation 150 in a separate display window 170 concurrently displayed with the user interface display 160. Notably, the separate display window 170 can include a selectable control which when activated can filter the technical documentation to a set of required commands. The separate display window 170 further can include a set of one or more selectable parameters corresponding to pre-established filters which when selected can provide for the further filtering of the technical documentation 150. Finally, the separate display window 170 can include a keyword searching interface through which keyword searches can be commanded for the technical documentation 150.

Figure 2:
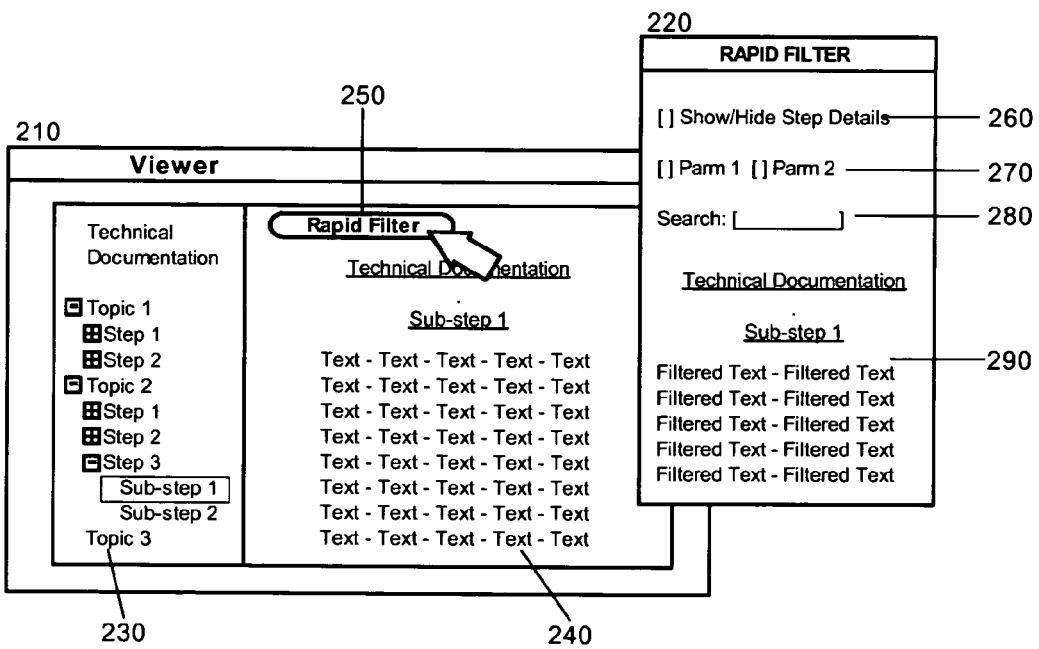
FIG. 2 is a pictorial illustration of a user interface configured for rapid filtering technical documentation; and, FIG. 3 is a flow chart illustrating a process for rapid filtering technical documentation.

In more particular illustration, FIG. 2 is a pictorial illustration of a user interface configured for rapid filtering technical documentation. As shown in FIG. 2, technical documentation 240 and navigation tree 230 can be rendered in a viewer 210. An activatable element 250 can be disposed either in the viewer 210 or in the technical documentation 240, itself which, in response to its activation, can result in the concurrent display of the rapid filter 220. The rapid filter 220 can include a filtered portion 290 of the technical documentation 240. The rapid filter 220 further can include a selectable control 260 which when activated can filter the technical documentation 240 to a set of required commands. The rapid filter 220 further can include a set of one or more selectable parameters 270 corresponding to pre-established filters which when selected can provide for the further filtering of the technical documentation 240. For instance, the pre-established filters can include showing just required commands, optional commands and platform specific commands. Finally, the rapid filter 220 can include a keyword searching interface 280 through which keyword searches can be commanded for the technical documentation 240.

Figure 3:
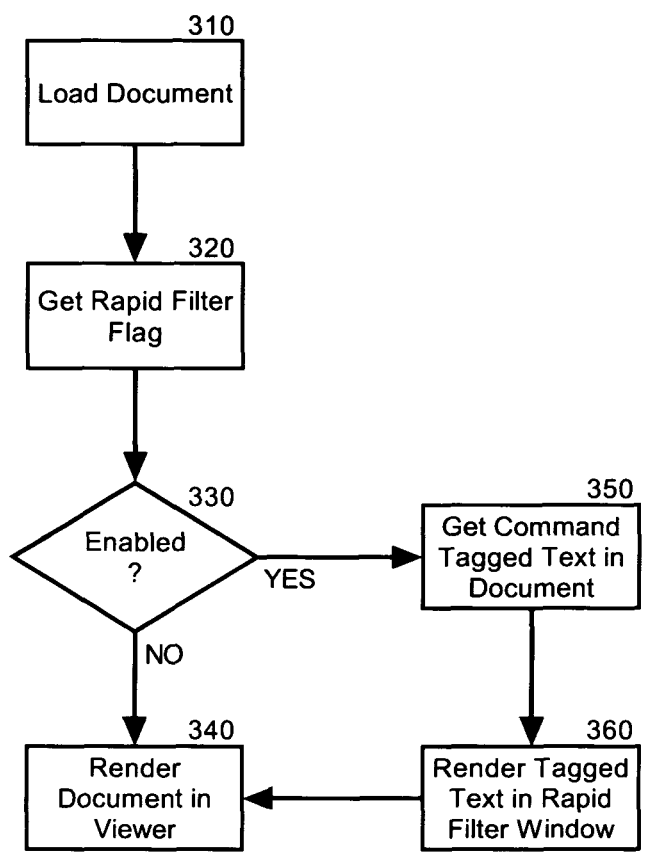

Turning now to FIG. 3, a flow chart is shown which illustrates a process for rapid filtering technical documentation. Beginning in block 310, technical documentation can be loaded for viewing. The technical documentation can be a markup language document in which different steps of a technical process can be annotated with a <step> attribute and the required commands for the step can be annotated with a <command> attribute, or any semantic element that serves a similar function. In block 320, a rapid filter flag can be identified and in decision block 330, it can be determined whether rapid filtering has been activated. If so, text within the technical documentation which has been annotated with a <command> tag can be extracted in block 350 and in block 360, the extracted text can be rendered within a rapid filter window. Concurrently, in block 340, the technical documentation can be rendered in the viewer. In this way, the reader can access both the full text of the technical documentation as well as a summarized form of the technical documentation.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for dynamically filtering technical documentation, the method comprising:

loading a technical document, said technical document including annotations for one or more different steps of a technical process and also annotations for one or more required commands for accomplishing one of the one or more different steps;

concurrently displaying a rapid filter user interface along with a technical documentation user interface;

rendering said technical document in said technical documentation user interface while rendering a summarized form of said technical document in said rapid filter user interface by creating the summarized form of said technical document by extracting text annotated with a command attribute from said technical document; and filtering said technical document according to a pre-configured filter selected within said rapid filter user interface.

2. The method of claim 1, further comprising hiding details for said technical document in said rapid filter user interface responsive to a selection.

3. The method of claim 1, further comprising keyword searching said technical document according to search terms provided through said rapid filter user interface.

4. The method of claim 1, further comprising
selecting portions of the technical document to render in the summarized form based upon the presence or absence of tags respectively associated with the portions.

5. The method of claim 1, wherein each of the one or more different steps is associated with a step attribute and also each of the one or more required commands is associated with a command attribute.

6. A data processing hardware system for dynamically filtering technical documentation, the system comprising:
a rapid filter coupled to a viewer for rendering technical documentation in a window;
said rapid filter executing on a processor of a computer, said rapid filter comprising program code to load a technical document, said technical document including annotations for one or more different steps of a technical process and also annotations for one or more required commands for accomplishing one of the one or more different steps, to concurrently render a summarized form of said technical document in a separate window by extracting text annotated with a command attribute from said technical document to create the summarized form of said technical document, and to filter said technical document according to a pre-configured filter.

7. The data processing hardware system of claim 6, wherein said rapid filter further comprises program code to selectably activate said pre-configured filter for said technical document.

8. The data processing hardware system of claim 6, wherein said rapid filter further comprises program code to keyword search said technical document.

9. The data processing hardware system of claim 6, wherein
the rapid filter selects portions of the technical document to render in the summarized form based upon the presence or absence of tags respectively associated with the portions.

10. The data processing hardware system of claim 6, wherein each of the one or more different steps is associated with a step attribute and also each of the one or more required commands is associated with a command attribute.

11. A computer program product comprising a computer usable memory having computer usable program code for dynamically filtering technical documentation, said computer program product including:
computer usable program code for loading a technical document, said technical document including annotations for one or more different steps of a technical process and also annotations for one or more required commands for accomplishing one of the one or more different steps;
computer usable program code for concurrently displaying a rapid filter user interface along with a technical documentation user interface;
computer usable program code for rendering said technical document in said technical documentation user interface while rendering a summarized form of said technical document in said rapid filter user interface by creating the summarized form of said technical document by extracting text annotated with a command attribute from said technical document; and,
computer usable program code for filtering said technical document according to a pre-configured filter selected within said rapid filter user interface.

12. The computer program product of claim 11, further comprising computer usable program code for hiding details for said technical document in said rapid filter user interface responsive to a selection.

13. The computer program product of claim 11, further comprising computer usable program code for keyword searching said technical document according to search terms provided through said rapid filter user interface.

14. The computer program product of claim 11, further comprising
computer usable program code for selecting portions of the technical document to render in the summarized form based upon the presence or absence of tags respectively associated with the portions.

15. The computer program product of claim 11, wherein each of the one or more different steps is associated with a step attribute and also each of the one or more required commands is associated with a command attribute.

* * * * *